(12) United States Patent
Kim et al.

(10) Patent No.: US 6,977,041 B2
(45) Date of Patent: Dec. 20, 2005

(54) APPARATUS FOR MANUFACTURING DEIONIZED WATER AND USING METHOD THEREOF

(75) Inventors: Sun-pil Kim, Yongin (KR); Seung-geol Choi, Suwon (KR)

(73) Assignee: Samsung Electronics Co., Ltd., (KR)

( * ) Notice: Subject to any disclaimer, the term of this patent is extended or adjusted under 35 U.S.C. 154(b) by 150 days.

(21) Appl. No.: 10/192,337

(22) Filed: Jul. 10, 2002

(65) Prior Publication Data

US 2003/0136738 A1    Jul. 24, 2003

(30) Foreign Application Priority Data

Jan. 24, 2002   (KR) ................................. 2002-4151

(51) Int. Cl.[7] ............................ B01D 63/00; C02F 1/44
(52) U.S. Cl. .................. 210/321.65; 210/652; 210/87; 210/90; 210/103; 210/134; 210/196; 210/253; 210/321.85; 210/321.76; 422/81; 422/63; 422/68.1
(58) Field of Search .................. 210/650, 652, 210/87, 90, 92, 93, 195.2, 196, 252–254, 210/260, 321.76, 321.85, 321.65, 636, 637, 210/739, 741, 103, 134, 321.88

(56) References Cited

U.S. PATENT DOCUMENTS

| | | | | |
|---|---|---|---|---|
| 4,046,685 A | * | 9/1977 | Bray | 210/652 |
| 4,921,610 A | * | 5/1990 | Ford et al. | 210/636 |
| 5,244,579 A | * | 9/1993 | Horner et al. | 210/652 |
| 6,402,954 B1 | * | 6/2002 | O'Keefe, Jr. | 210/636 |
| 6,508,937 B1 | * | 1/2003 | Kawashima et al. | 210/652 |
| 6,533,937 B1 | * | 3/2003 | Adachi et al. | 210/636 |

* cited by examiner

*Primary Examiner*—W. L. Walker
*Assistant Examiner*—Krishnan S. Menon
(74) *Attorney, Agent, or Firm*—F. Chau & Associates, LLC

(57) ABSTRACT

An apparatus and method for manufacturing deionized water is provided. Water is supplied to a first conduit. A plurality of reverse osmotic pressure vessels are connected to the first conduit. A filtering experimental vessel is connected to the first conduit, the filtering experimental vessel is separated from the plurality of reverse osmotic pressure vessels. A second conduit is connected to the plurality of reverse osmotic pressure vessels and the filtering experimental vessel for outputting the deionized water. A third conduit is connected to the plurality of reverse osmotic pressure vessels and the filtering experimental vessel for outputting concentrated ion water. The plurality of reverse osmotic pressure vessels and the filtering experimental vessel concurrently or independently separates the supplying water into the deionized water and the concentrated ion water.

27 Claims, 4 Drawing Sheets

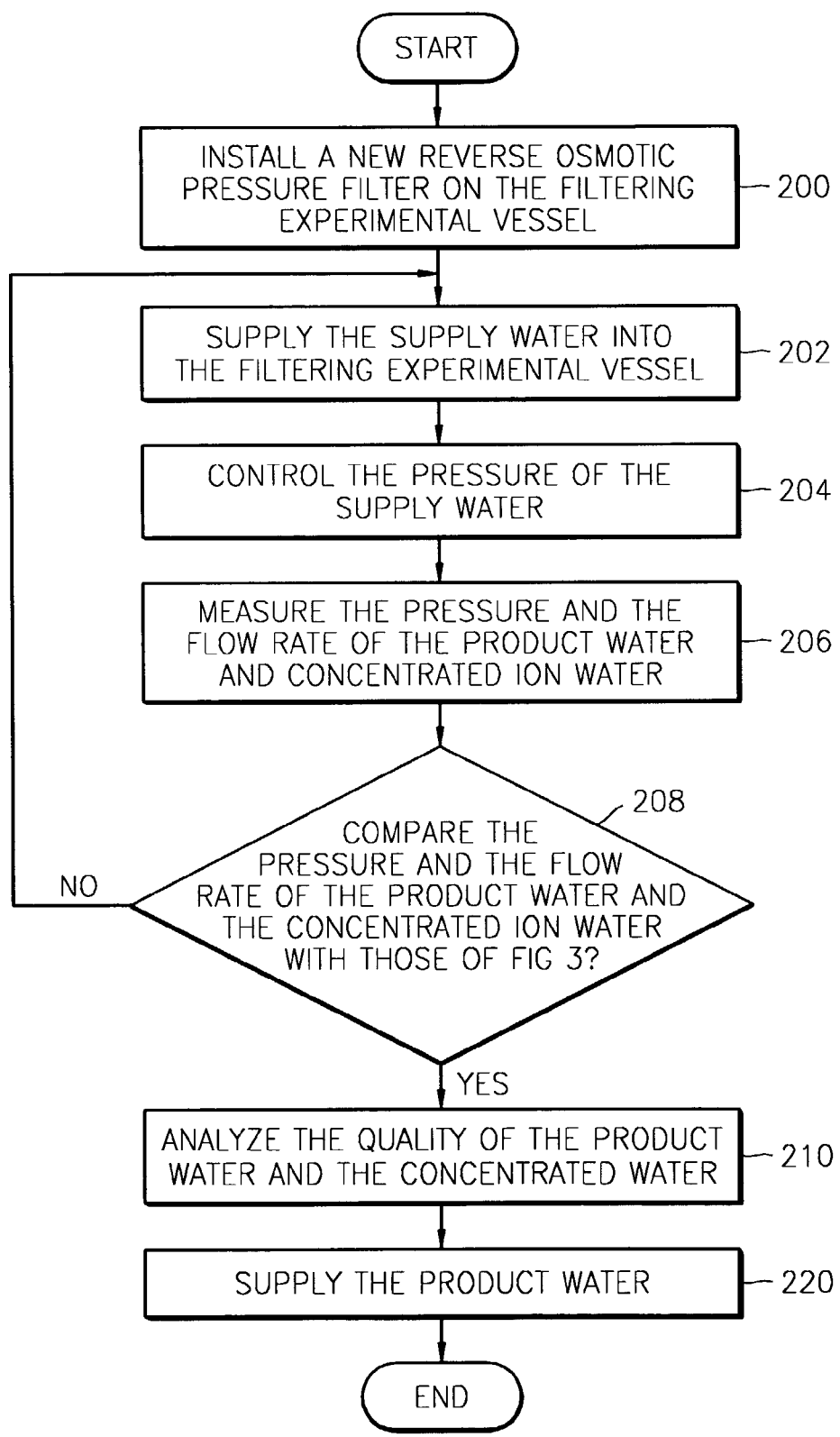

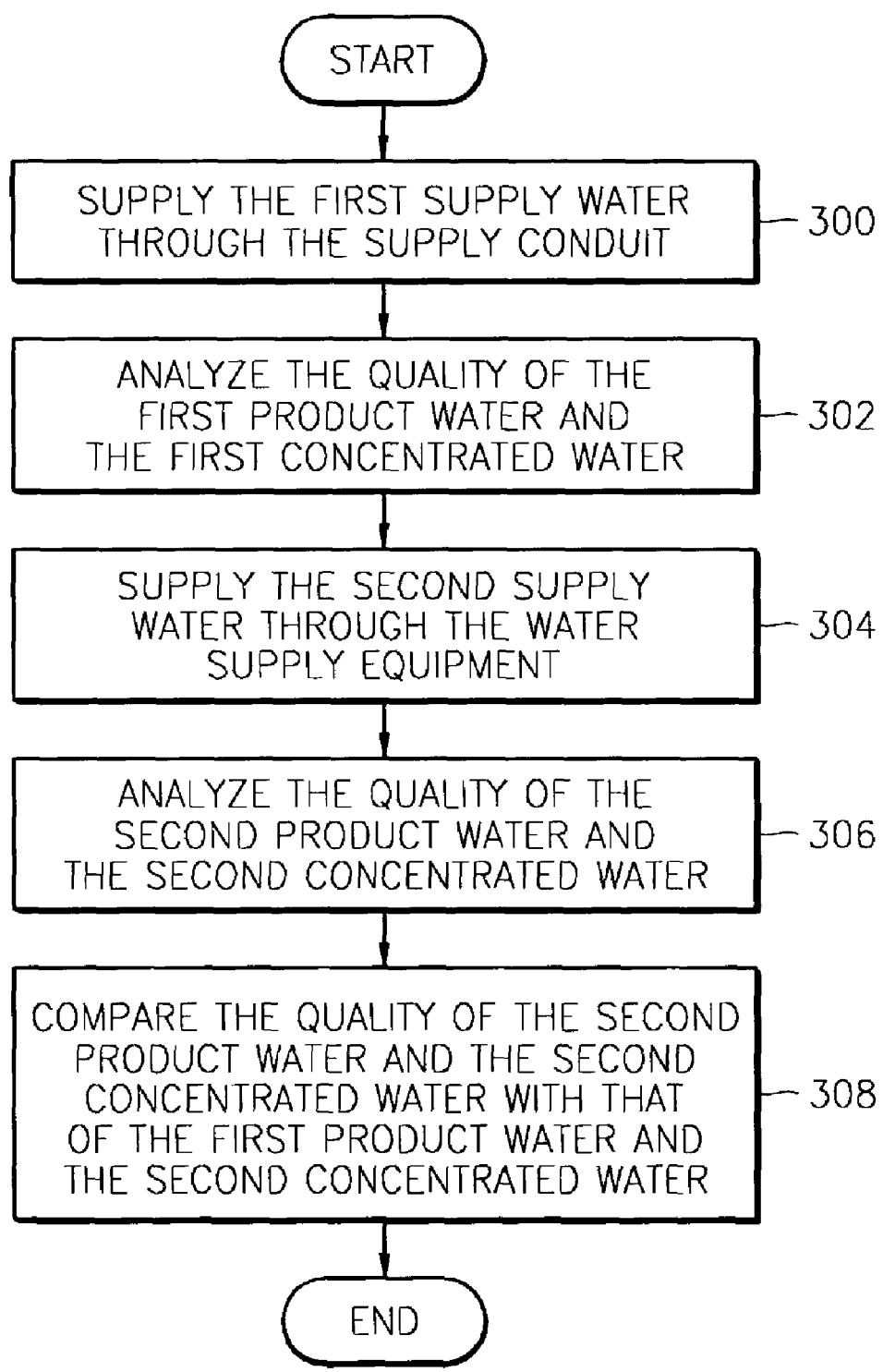

APPARATUS FOR MANUFACTURING DEIONIZED WATER AND USING METHOD THEREOF

BACKGROUND OF THE INVENTION

1. Field of the Invention

The present invention relates to an apparatus for manufacturing deionized water and using method thereof and; more particularly, to an apparatus and method having a reverse osmotic vessel for manufacturing deionized water.

2. Description of the Related Art

In fabricating highly integrated semiconductor devices, any contamination materials such as particles remaining on semiconductor substrates after cleaning, electrostatic discharge, and water marks, etc. exert an undesirable influence on subsequent process steps and adversely affect device yield. Generally, semiconductor devices are cleaned during fabrication by a wet cleaning process or wet etching process to remove contaminants from semiconductor substrates. For the cleaning process, pure deionized water is used with various chemicals. If deionized water is unpure, the semiconductor substrates may not be properly cleaned. Therefore, a need exists for the production of pure deionized water.

Generally, deionized water is manufactured by using a reverse osmotic pressure method. The reverse osmotic pressure method separates solution having concentration differences to a higher ion solution and a lower ion solution using an apparatus having a reverse osmotic pressure membrane. The higher ion solution is pressurized over the osmotic pressure to transfer water in the higher ion solution to the lower ion solution, and then, the higher ion solution is concentrated with ions and the lower ion solution becomes deionized water. One characteristic of the reverse osmotic pressure method is to purify ions under 1 nm.

An important unit for manufacturing ionized water by using the reverse osmotic pressure method is a reverse osmotic membrane. The reverse osmotic membrane is not durable, thereby deteriorating quality of the deionized water when it is used for a long period. Therefore, the reverse osmotic membrane should be changed by periodically evaluating the membrane performance.

The evaluation of the membrane performance is performed by using a filtering experimental apparatus. The filtering experimental apparatus evaluates a minimum performance by supplying a small amount of water. That is, the membrane is not evaluated in-situ for manufacturing the deionized water, but evaluated by an indirect method. Thus the evaluation substantially depends on operator's skill and may not be correct. Furthermore, in case that a quality of the deionized water is poor, it is difficult to find whether the membrane is poor or the supplied raw water is poor. As a result, if the quality of deionized water is poor, the reliability of semiconductor devices using the deionized water is suffers, thereby lowering yield and productivity of the semiconductor devices.

Therefore, it is highly desirable to design an apparatus and a method for manufacturing deionized water, which has a filtering experimental unit thereof.

SUMMARY OF THE INVENTION

An apparatus for manufacturing deionized water is provided, which includes: a first conduit for supplying water; a plurality of reverse osmotic pressure vessels connected to the first conduit; a filtering experimental vessel connected to the first conduit, the filtering experimental vessel being separated from the plurality of reverse osmotic pressure vessels; a second conduit connected to the plurality of reverse osmotic pressure vessels and the filtering experimental vessel for outputting the deionized water; and a third conduit connected to the plurality of reverse osmotic pressure vessels and the filtering experimental vessel for outputting concentrated ion water, wherein the plurality of reverse osmotic pressure vessels and the filtering experimental vessel concurrently or independently separates the supplying water into the deionized water and the concentrated ion water.

According to an embodiment of the present invention, the apparatus further includes a first flow control valve at an inlet of the filtering experimental vessel on the first conduit for separately operating the plurality of reverse osmotic pressure vessels and the filtering experimental vessel; a second flow control valve at an outlet of the filtering experimental vessel on the second conduit for separately operating the plurality of reverse osmotic pressure vessels and the filtering experimental vessel; a third flow control valve at an outlet of the filtering experimental vessel on the third conduit for separately operating the plurality of reverse osmotic pressure vessels and the filtering experimental vessel.

According to an embodiment of the present invention, the apparatus further includes a first pressure indicator on the first conduit for measuring the supplying water pressure; a second pressure indicator on the second conduit for measuring the deionized water pressure; a third pressure indicator on the third conduit for measuring the concentrated ion water pressure; a cleaning water reservoir and a fourth conduit connected to the first conduit and the cleaning water reservoir for supplying cleaning water in the cleaning water reservoir with the plurality of reverse osmotic pressure vessels and the filtering experimental vessel; a first sampling valve on the fourth conduit for sampling and testing the supplying water; a fourth flow control valve for regulating flow rate of the cleaning water; a fifth conduit connected to the second conduit and the cleaning water reservoir for supplying the deionized water with the cleaning water reservoir; a second sampling valve on the fifth conduit for sampling and testing the deionized water; a first flow meter for measuring flow rate of the deionized water flowed into the cleaning water reservoir; a sixth conduit connected to the third conduit and the cleaning water reservoir for supplying the concentrated ion water with the cleaning water reservoir; a third sampling valve on the sixth conduit for sampling and testing the concentrated ion water; a second flow meter for measuring flow rate of the concentrated ion water flowed into the cleaning water reservoir.

A method for using an apparatus for manufacturing deionized water is also provided, which includes the steps of: providing raw water to a plurality of reverse osmotic pressure vessels and a filtering experimental vessel at a predetermined pressure; measuring pressures and flow rates of the deionized water and concentrated ion water produced by passing the raw water into the plurality of reverse osmotic pressure vessels and the filtering experimental vessel; regulating the raw water pressure and the flow rate, and monitoring a deionized level of the deionized water and the concentrated ion water if the pressure and the flow rate are within predetermined ranges; and producing the deionized water and purging the concentrated ion water if the deionized level of the deionized water is within predetermined ranges.

A method for using an apparatus for manufacturing deionized water is also provided, which comprises the steps of: installing a reverse osmotic pressure filter into a filtering experimental vessel; providing raw water to the filtering experimental vessel at a predetermined pressure; measuring pressures and flow rates of the deionized water and concentrated ion water produced by passing the raw water into the filtering experimental vessel; comparing the pressures and the flow rates of the deionized water and the concentrated ion water produced by passing the raw water into the filtering experimental vessel and pressures and flow rates of deionized water and concentrated ion water produced by passing the raw water to a plurality of reverse osmotic pressure vessels; regulating the pressure and the flow rate of the raw water or changing the reverse osmotic pressure filter if the compared pressures and flow rates are out of the predetermined ranges, and monitoring a deionized level of the deionized water and the concentrated ion water if the compared pressures and flow rates are within the predetermined ranges; and producing the deionized water and purging the concentrated ion water if the deionized level of the deionized water is within predetermined ranges.

A method for using an apparatus for manufacturing deionized water is also provided, which comprises the steps of: providing first raw water to a filtering experimental vessel; analyzing first deionized water and first concentrated ion water produced by passing the first raw water into the filtering experimental vessel; providing second raw water to the filtering experimental vessel; analyzing second deionized water and second concentrated ion water produced by passing the second water into the filtering experimental vessel; and comparing the first deionized water and the second deionized water, and the first concentrated ion water and the second concentrated ion water for deciding water quality between the first raw water and the second raw water, and producing the deionized water and purging the concentrated ion water if the deionized level of the deionized water is within predetermined ranges.

BRIEF DESCRIPTION OF THE DRAWINGS

The above and other objects and advantages of the present invention will become more apparent by describing in detail preferred embodiments thereof with reference to the accompanying drawings in which:

FIG. 4 is another exemplary flow chart for using the apparatus for manufacturing the deionized water of FIG. 1; and FIG. 5 is another exemplary flow chart for using the apparatus for manufacturing the deionized water of FIG. 1.

DETAILED DESCRIPTION OF PREFERRED EMBODIMENTS

Figure 1:
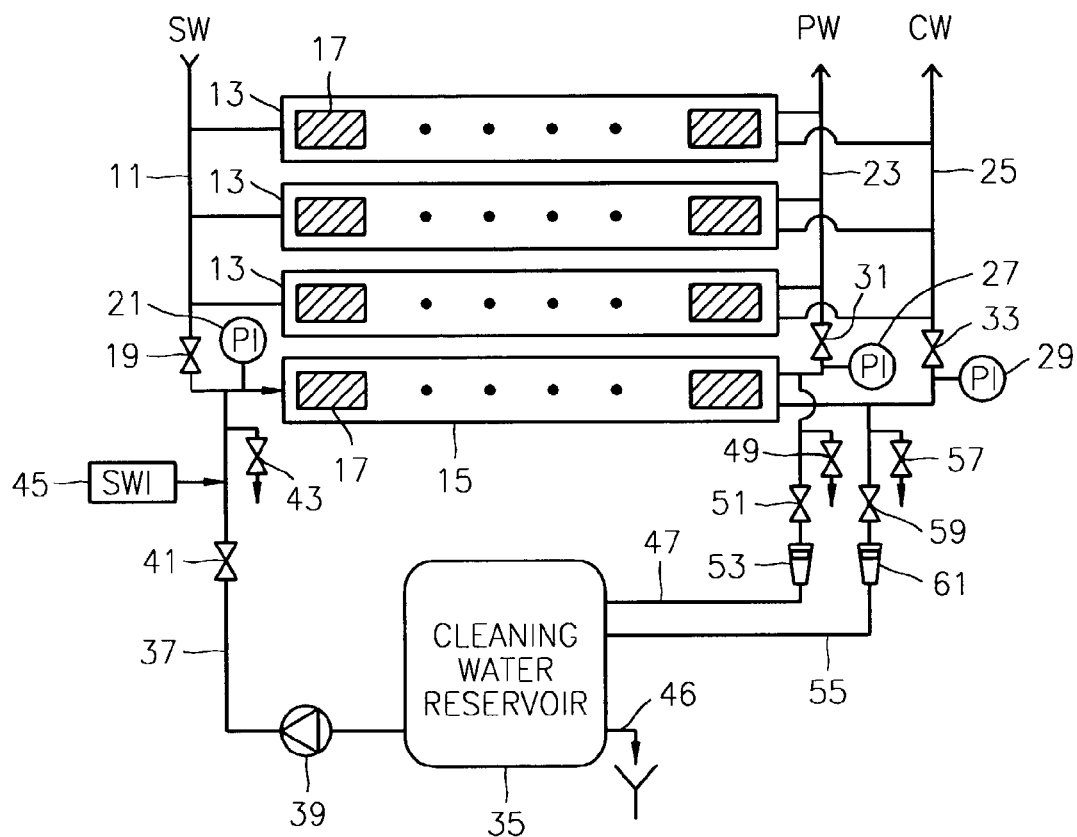
FIG. 1 is a schematic view of an apparatus for manufacturing deionized water according to an embodiment of the present invention.

Hereinafter, the present invention will be described in detail with reference to the accompany drawings. It should be noted that like reference numerals are used for designation of like or equivalent parts or portion for simplicity of illustration and explanation. Also, in the following description, specifications will be made to provide a thorough understanding about the present invention. It is apparent to on skilled in the art that the present invention can be achieved without the specifications. There will be omission of detailed description about well known functions and structures to clarify key points of the present invention.

FIG. 1 is a schematic view of an apparatus for manufacturing deionized water according to an embodiment of the present invention.

Referring to FIG. 1, the apparatus for manufacturing deionized water includes a supplying conduit 11 receiving first supplying water SW, a plurality of reverse osmotic pressure vessels 13 connected to the supplying conduit 11, and a filtering experimental vessel 15 connected to the supplying conduit 11. According to an embodiment of the present invention, each of the plurality of reverse osmotic pressure vessels 13 and 15 includes a plurality of reverse pressure modules 17, e.g., six (6) reverse osmotic pressure modules which will be described in FIG. 2. FIG. 1 shows one filtering equipment vessel 15 but a plurality of filtering experimental vessels can be used. The plurality of reverse osmotic pressure vessels 13 produces the deionized water, the filtering experimental vessel 15 is installed for evaluating performance of reverse osmotic filters (not shown) installed in the plurality of reverse osmotic pressure vessels 13 and the filtering experimental vessel 15 and for monitoring quality of the deionized water produced from the apparatus.

According to an embodiment of the present invention, the apparatus further includes a flow regulator 19 for regulating flow rate of the first supplying water SW and a pressure indicator 21 for metering the pressure of the first supplying water SW. Preferably, the flow regulator 19 and the pressure indicator 21 are installed on the supplying conduit 11 and before the filtering experimental vessel 15. The flow regulator 19 is used for separately operating the plurality of reverse osmotic pressure vessels 13 and the filtering experimental vessel 15.

According to an embodiment of the present invention, the apparatus further includes a product output conduit 23 for outputting product water PW which is deionized water and a concentrated water output conduit 25 for outputting concentrated ion water CW. The product output conduit 23 and the concentrated water output conduit 25 are connected to the plurality of reverse osmotic pressure vessels 13 and the filtering experimental vessel 15. A product regulator 31 for regulating flow rate of the product water PW and a pressure indicator 27 for metering the pressure of the product water PW from the filtering experimental vessel 15 are disposed downstream of the filtering experimental vessel 15. A concentration water regulator 33 for regulating flow rate of the concentration ion water CW and a pressure indicator 29 for metering pressure of the concentration ion water from the filtering experimental vessel 15 are installed after the filtering experimental vessel 15. The concentration water regulator 33 and the pressure indicator 29 are used for separately operating the plurality of reverse osmotic pressure vessels 13 and the filtering experimental vessel 15.

According to an embodiment of the present invention, the apparatus further includes a cleaning water reservoir 35 for supplying cleaning water with the plurality of reverse osmotic pressure vessels 13 and the filtering experimental vessel 15 through a cleaning water supply conduit 37. One end of he cleaning water supply conduit 37 is connected between the flow regulator 19 and the pressure indicator 21. A pump 39 for pumping the cleaning water and a cleaning water regulator 41 for regulating the flow rate of the cleaning water are installed on the cleaning water supply conduit 37.

A sampling valve 43 is connected to the cleaning water supply conduit 37 for sampling and testing the first supplying water SW. The cleaning water reservoir 35 includes a drain conduit 46 for draining the cleaning water at a lower portion thereof.

According to an embodiment of the present invention, the apparatus further includes a second supplying water equipment 45 and is further connected to the cleaning water supply conduit 37 for supplying another supplying water which is different from the first supplying water SW.

According to an embodiment of the present invention, the apparatus further includes a product water feedback conduit 47 installed between the product output conduit 23 adjacent to the filtering experimental vessel 15 and the cleaning water reservoir 35 for feedback of the product water PW (feedback water) to the cleaning water reservoir 35. The feedback conduit 47 includes a product water sampling valve 49 for sampling and testing the product water PW, a feedback water regulator 51 for regulating flow rate of the feedback water, and a flow meter 53 for metering the flow rate of the feedback water.

According to an embodiment of the present invention, the apparatus further includes a concentrated water feedback conduit 55 installed between the concentrated water output conduit 25 adjacent to the filtering experimental vessel 15 and the cleaning water reservoir 35 for feedback of the concentrated ion water CW (feedback ions water) to the cleaning water reservoir 35. The concentrated water feedback conduit 55 includes a concentrated water sampling valve 57 for sampling and testing the concentrated ion water CW, a feedback water regulator 59 for regulating flow rate of the feedback ions water, and a flow meter 61 for metering the flow rate of the feedback ions water.

Figure 2:
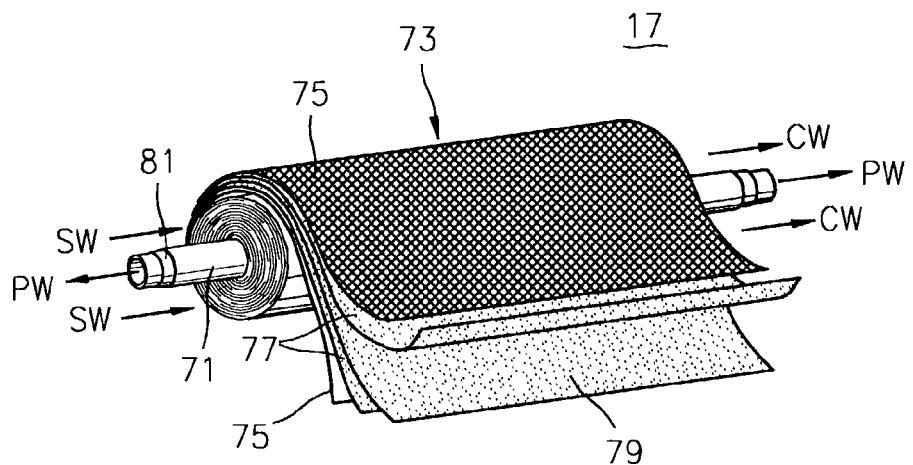
FIG. 2 is a partially enlarged view of a reverse osmotic module of FIG. 1.

FIG. 2 is a partially enlarged view of the osmotic pressure module 17 in the plurality of reverse osmotic pressure vessels 13 and the filtering experimental vessel 15 of FIG. 1.

Referring to FIG. 2, the reverse osmotic pressure module 17 includes a product guiding conduit 71 having a plurality of holes (not shown) in a substantially core portion thereof. According to an embodiment of the present invention, there are about several tens to several hundreds of holes and each hole has a diameter of about 2 mm. The product guiding conduit 71 is wrapped with a revere osmotic pressure filter 73. The revere osmotic pressure filter 73 includes a mesh spacer 75 for guiding the supplying water, a reverse osmotic membrane 77, and a permeation carrier 79 for guiding the product water PW. The supplying water SW is supplied from a first side (from left shown by arrow) and the concentrated ion water CW is output an a second side (on right), and the product water PW is output to and from both sides of the product guiding conduit 71. O-rings 81 are also included at both ends of the reverse osmotic pressure module 17 for connecting to another reverse osmotic pressure modules.

Figure 3:
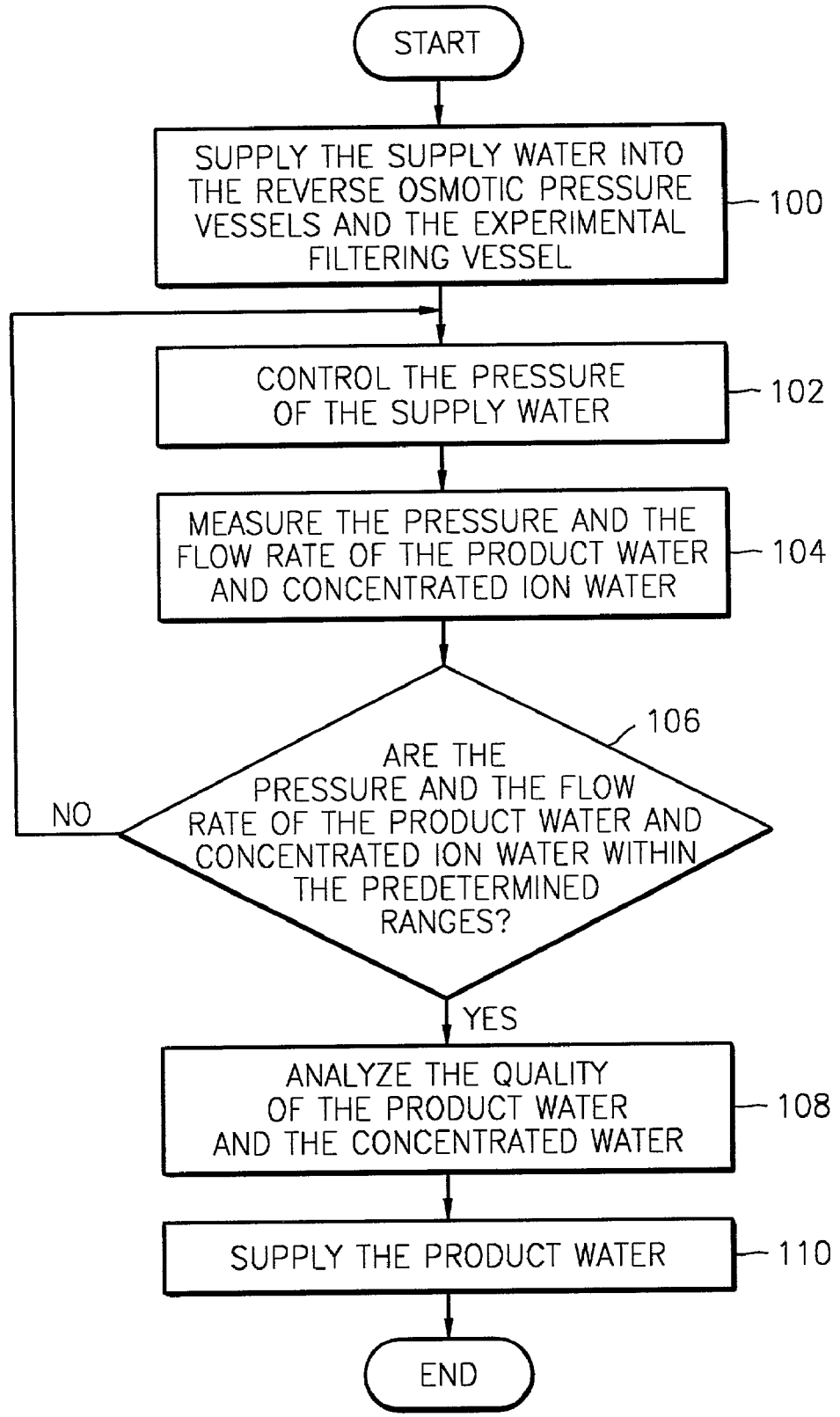
FIG. 3 is an exemplary flow chart for using an apparatus for manufacturing deionized water of FIG. 1.

FIG. 3 is an exemplary flow chart for using the apparatus for manufacturing the deionized water of FIG. 1.

Referring to FIGS. 1 and 3, the first supplying water SW is supplied into the plurality of reverse osmotic pressure vessels 13 and the filtering experimental vessel 15 through the supplying conduit 11 (Step 100). The first supplying water SW is separated into the product water PW and the concentrated ion water CW in the plurality of reverse osmotic pressure vessels 13 and the filtering experimental vessel 15 by a reverse osmotic method. The product water PW and the concentrated ion water CW are output through the product output conduit 23 and the concentrated water output conduit 25. The product water PW and the concentrated ion water CW from the filtering experimental vessel 15 can also be input into the cleaning water reservoir 35 through the product water feedback conduit 47 and the concentrated water feedback conduit 55.

Next, the pressure of the first supplying water SW is controlled by the flow regulator 19 (Step 102). The pressure of the first supplying water SW is indicated by the process indicator 21. The product water PW pressure and flow rate and the concentrated ion water CW are measured (Step 104). The pressure and the flow rate of the product water PW are measured by the pressure indicator 27 and the flow meter 53. The pressure and the flow rate of the concentrated ion water CW are measured by the pressure indicator 29 and the flow meter 61.

Next, the pressure and the flow rate of the product water PW and the concentrated ion water CW are checked (Step 106). If the pressure and the flow rate of the product water PW and the concentrated ion water CW are not within the predetermined ranges, the pressure of the first supplying water SW is regulated (Step 102). If the pressure and the flow rate of the product water PW and the concentrated ion water CW are within the predetermined ranges, qualities of the product water PW and the concentrated ion water CW are analyzed in-situ through the product water sampling valve 49 and the concentrated water sampling valve 57 (Step 108).

Next, if the qualities of the product water PW and the concentrated ion water CW are within the predetermined ranges, the product water PW is supplied into semiconductor lines for manufacturing semiconductor devices (Step 110) and the concentrated ion water CW is purged through the concentrated water output conduit 25.

FIG. 4 is another exemplary flow chart for using the apparatus for manufacturing the deionized water of FIG. 1.

Referring to FIGS. 1 and 4, a new reverse osmotic pressure filter to be tested is installed on the filtering experimental vessel 15 (Step 200). The product regulator 31 and the concentrated water regulator 33 are closed, and the first supplying water SW is supplied into the filtering experimental vessel 15 through the supplying conduit 11 (Step 202). The first supplying water SW is separated into the product water PW and the concentrated ion water CW in the filtering experimental vessel 15, and the product water PW and the concentrated ion water CW are supplied into the cleaning water reservoir 35.

Next, the pressure of the first supplying water SW is controlled by the flow regulator 19 (Step 204). The pressure of the first supplying water SW is indicated by the pressure indicator 21. The pressure and the flow rate of the product water PW and the concentrated ion water CW are measured (Step 206). The pressure and the flow rate of the product water PW are measured by the pressure indicator 27 and the flow meter 53. The pressure and the flow rate of the concentrated ion water CW are measured by the pressure indicator 29 and the flow meter 61.

Next, the pressure and the flow rate of the product water PW and the concentrated ion water CW of FIG. 4 are compared with the pressure and the flow rate of the product water PW and the concentrated ion water CW of FIG. 3 (Step 208). If the compared pressure and flow rate of the product water PW are not within the predetermined ranges, e.g., about 1–3 $kg/cm^2$ and about 5–7 $m^3$/hour, respectively, and if the compared pressure and flow rate of the concentrated ion water CW are not within the predetermined ranges, e.g., about 9–15 $kg/cm^2$ and about 1–2 $m^3$/hour, respectively, the pressure and the flow rate of the first supplying water SW are regulated or the reverse osmotic pressure filter 73 (in FIG. 2) is exchanged for a new one (Step 204). If the compared pressure and flow rate are within the predetermined ranges, the amount of total organic carbon (TOC) of the product water PW and the concentrated ion water CW are analyzed in-situ through the product water sampling valve 49 and concentrated water sampling valve 57 (Step 210).

Next, if the amount of TOC of the product water PW is under a predetermined value, e.g., about 10 ppb (part per billion) and the amount of TOC of the concentrated ion water CW is over a predetermined value, e.g., about 100 ppb, the product water PW is supplied into semiconductor lines for manufacturing semiconductor devices (Step 212) and the concentrated ion water CW is wasted through the concentrated water output conduit 25.

FIG. 5 is another exemplary flow chart for using the apparatus for manufacturing the deionized water of FIG. 1.

Referring to FIGS. 1 and 5, the first supplying water SW is supplied into the plurality of reverse osmotic pressure vessels 13 and the filtering experimental vessel 15 through the supplying conduit 11 (Step 300). The first supplying water SW is separated into a first product water PW and a first concentrated ion water CW in the plurality of reverse osmotic pressure vessels 13 and the filtering experimental vessel 15, and the first product water PW and the first concentrated ion water CW are output through the product output conduit 23 and the concentrated water output conduit 25. A portion of the first product water PW and a portion of the first concentrated ion water CW from the filtering experimental vessel 15 are input into the cleaning water reservoir 35 through the product water feedback conduit 47 and the concentrated water feedback conduit 55.

Next, qualities of the first product water PW and the first concentrated ion water CW are analyzed in-situ through the product water sampling valve 49 and concentrated water sampling valve 57 (Step 302).

Next, the flow regulator 19 is closed and a second supplying water is supplied into the filtering experimental vessel 15 through the second supplying water equipment 45 (Step 304). The second supplying water is separated into a second product water (not shown) and a second concentrated ion water (not shown) in the filtering experimental vessel 15 and the second product water and the second concentrated ion water are output through the product output conduit 23 and the concentrated water output conduit 25.

Next, qualities of the second product water and the second concentrated ion water are analyzed in-situ through the product water sampling valve 49 and concentrated water sampling valve 57 (Step 306).

Next, the qualities of the second product water and the second concentrated ion water are compared with the qualities of the first product water PW and the first concentrated ion water CW (Step 308).

According to the present invention as stated above, an apparatus for manufacturing deionized water includes a plurality of reverse osmotic pressure vessels and a filtering experimental vessel having a substantially similar structure with the plurality of reverse osmotic pressure vessels which can be separately operated. Therefore, a reverse osmotic pressure filter in the reverse osmotic pressure vessels is evaluated in-situ and a new reverse osmotic pressure filter is also evaluated without stopping operation of the apparatus. Further, the apparatus of the present invention is cleaned by using a cleaning water reservoir and qualities of product water are monitored in-situ by using a product sampling valve. Furthermore, the apparatus includes a second supplying water equipment, thereby comparing qualities of water between supplying waters.

Although the present invention has been described herein with reference to the accompanying drawings, it is to be understood that the present invention is not limited to those precise embodiments, and various other changes and modifications may be affected therein by one skilled in the art without departing from the scope or spirit. It will be apparent to one of ordinary skill in the art that modifications of the described embodiment may be made without departing from the spirit and scope of the invention. All such changes and modifications are intended to be included within the scope of the invention as defined by the appended claims.

What is claimed is:

1. An apparatus for manufacturing deionized water, comprising:
   a first conduit for supplying water, the first conduit including a first flow control valve;
   a plurality of reverse osmotic pressure vessels connected to the first conduit, wherein each reverse osmotic pressure vessel comprises a water inlet, a deionized water outlet, and a concentrated water outlet;
   a filtering experimental vessel connected to the first conduit, wherein the filtering experimental vessel comprises a water inlet, a deionized water outlet, and a concentrated water;
   a second conduit connected to the plurality of reverse osmotic pressure vessels and the filtering experimental vessel for outputting the deionized water, the second conduit including a second flow control valve;
   a third conduit connected to the plurality of reverse osmotic pressure vessels and the filtering experimental vessel for outputting concentrated ion water, the third conduit including a third flow control valve;
   a reservoir comprising a first outlet, a first inlet and a second inlet;
   a fourth conduit connecting the first conduit to the first outlet of the reservoir;
   a fifth conduit connecting the second conduit to the first inlet of the reservoir; and
   a sixth conduit connecting the third conduit to the second inlet of the reservoir, wherein the first flow control valve, when closed, isolates the fourth conduit and the water inlet of the filtering experimental vessel from the water inlets of the reverse osmotic pressure vessels,
   wherein the second flow control valve, when closed, isolates the fifth conduit and the deionized water outlet of the filtering experimental vessel from the deionized water outlets of the reverse osmotic pressure vessels, and
   wherein the third flow control valve, when closed, isolates the sixth conduit and the concentrated water outlet of the filtering experimental vessel from the concentrated water outlets of the reverse osmotic pressure vessels.

2. An apparatus of claim 1, wherein the first flow control valve is disposed upstream from the water inlet of the filtering experimental vessel for controlling flow of the water in the first conduit into the filtering experimental vessel.

3. An apparatus of claim 1, wherein the second flow control valve is disposed downstream from the deionized water outlet of the filtering experimental vessel for controlling flow of the deionized water exiting the filtering experimental vessel into the second conduit.

4. An apparatus of claim 1, wherein the third flow control valve is disposed downstream from the concentrated water outlet of the filtering experimental vessel for controlling flow of the concentrated ion water exiting the filtering experimental vessel into the third conduit.

5. An apparatus of claim 1, further comprising a first pressure indicator disposed at the water inlet of the filtering experimental vessel for measuring pressure of the water entering the filtering experimental vessel.

6. An apparatus of claim 1, further comprising a second pressure indicator disposed at the deionized water outlet of the filtering experimental vessel for measuring pressure of the deionized water exiting the filtering experimental vessel.

7. An apparatus of claim 1, further comprising a third pressure indicator disposed at the deionized water outlet of the filtering experimental vessel for measuring pressure of the concentrated ion water exiting the filtering experimental vessel.

8. An apparatus of claim 1, wherein the reservoir includes cleaning water, the cleaning water is supplied from the reservoir to the plurality of reverse osmotic pressure vessels and the filtering experimental vessel via the first and fourth conduits.

9. An apparatus of claim 1, further comprising a first sampling valve disposed at the fourth conduit for sampling and testing the water.

10. An apparatus of claim 8, further comprising a fourth flow control valve disposed at the fourth conduit for regulating flow rate of the cleaning water being supplied to the reverse osmotic pressure vessels and the filtering experimental vessel.

11. An apparatus of claim 8, wherein the fifth conduit connected to the second conduit and the second outlet of the reservoir supplies the deionized water to the reservoir.

12. An apparatus of claim 1, further comprising a second sampling valve disposed at the fifth conduit for sampling and testing the deionized water.

13. An apparatus of claim 1, further comprising a first flow meter disposed in the fifth conduit for measuring flow rate of the deionized water flowing into the reservoir.

14. An apparatus of claim 1, wherein the sixth conduit connected to the third conduit and the second outlet of the reservoir supplies the concentrated ion water to the reservoir.

15. An apparatus of claim 1, further comprising a third sampling valve disposed at the sixth conduit for sampling and testing the concentrated ion water.

16. An apparatus of claim 1, further comprising a second flow meter disposed in the sixth conduit for measuring flow rate of the concentrated ion water flowing into the reservoir.

17. An apparatus of claim 1, wherein the reverse osmotic pressure vessels and the filtering experimental vessel comprise a plurality of reverse osmotic pressure modules.

18. An apparatus of claim 1, further comprising a regulator for controlling pressure and flow rate of the supplied water in the first conduit.

19. An apparatus of claim 18, wherein pressure and flow rates of the deionized water in the second conduit and the concentrated ion water in the third conduit can be maintained within predetermined ranges by the regulator varying the pressure and the flow rate of the supplied water in the first conduit.

20. An apparatus of claim 19, wherein the predetermined ranges of the pressure and the flow rate of the deionized water in the second conduit are about 1 to about 3 $Kg/cm^2$ and about 5 to about 7 $m^3$/hour, respectively.

21. An apparatus of claim 19, wherein the predetermined ranges of the pressure and the flow rate of the concentrated ion water in the third conduit are about 9 to about 15 $Kg/cm^2$ and about 1 to about 2 $m^3$/hour, respectively.

22. An apparatus of claim 1, further comprising supplying water equipment connected to the fourth conduit.

23. An apparatus of claim 1, further comprising a pump disposed at the fourth conduit for pumping a fluid from the reservoir to the plurality of osmotic pressure vessels and the filtering experimental vessels.

24. An apparatus of claim 1, wherein the reservoir further comprises a second outlet for draining the reservoir.

25. An apparatus of claim 1, further comprising a fourth flow control valve disposed at the fourth conduit, wherein the fourth flow control valve regulates a flow rate of a fluid within the fourth conduit or, when closed, isolates the reservoir from the filtering experimental vessel and the plurality of osmotic pressure vessels.

26. An apparatus of claim 1, further comprising a fifth flow control valve disposed at the fifth conduit, wherein the fifth flow control valve regulates a flow rate of the deionized water within the fifth conduit or, when closed, isolates the reservoir from the filtering experimental vessel and the plurality of osmotic pressure vessels.

27. An apparatus of claim 1, further comprising a sixth flow control valve disposed at the sixth conduit, wherein the sixth flow control valve regulates a flow rate of the concentrated water within the sixth conduit or, when closed, isolates the reservoir from the filtering experimental vessel and the plurality of osmotic pressure vessels.

* * * * *